United States Patent
Chen et al.

(10) Patent No.: US 9,247,522 B1
(45) Date of Patent: Jan. 26, 2016

(54) LOCATION-BASED REMINDER PROCESS

(71) Applicant: Google Inc., Mountain View, CA (US)

(72) Inventors: Chia-Nee Michelle Chen, Adliswill (CH); Ida Mayer, Mountain View, CA (US); Dave Cohen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 13/730,236

(22) Filed: Dec. 28, 2012

(51) Int. Cl.
*H04W 4/02* (2009.01)
*H04W 64/00* (2009.01)

(52) U.S. Cl.
CPC .................................. *H04W 64/006* (2013.01)
USPC ....................................... 455/456.3; 705/7.18

(58) Field of Classification Search
CPC ............. H04L 29/08657; B60R 25/01; G06Q 10/08355; G06Q 10/1095; G01C 21/36
USPC .................. 455/456.3, 414.3; 705/7.18, 7.19; 701/410, 533; 709/204
See application file for complete search history.

(56) References Cited

U.S. PATENT DOCUMENTS

| | | | |
|---|---|---|---|
| 6,732,080 B1 * | 5/2004 | Blants | 705/7.18 |
| 7,084,758 B1 | 8/2006 | Cole | |
| 7,139,722 B2 | 11/2006 | Perrella et al. | |
| 8,112,299 B2 | 2/2012 | Kim et al. | |
| 8,660,790 B2 | 2/2014 | Stahl | |
| 2007/0118415 A1 | 5/2007 | Chen et al. | |
| 2010/0312838 A1 | 12/2010 | Lyon et al. | |
| 2013/0231864 A1 * | 9/2013 | Stahl et al. | 701/537 |

* cited by examiner

*Primary Examiner* — Phuoc H Doan
(74) *Attorney, Agent, or Firm* — IP Spring

(57) ABSTRACT

A computer-implemented method and computing system for identifying, using one or more computing devices, an appointment scheduled for at least one user. Some embodiments may include determining, using the one or more computing devices, a present location for the at least one user and generating, using the one or more computing devices, a reminder for the appointment based upon, at least in part, the present location.

17 Claims, 5 Drawing Sheets

LOCATION-BASED REMINDER PROCESS

TECHNICAL FIELD

This disclosure relates to event reminders and, more particularly, to a computer-implemented method for generating and updating reminders based upon the location of the user, the location of the event, or both.

BACKGROUND

Existing email systems may be configured to generate one or more reminders for upcoming events scheduled in a user's calendar. For example, by default, reminders may be sent some set time (e.g. 10 minutes) before an event. The user may be provided with the option to change the reminder time to a fixed time interval (e.g. 20 or 30 minutes before an event). In each case, these reminders occur at a predefined time regardless of extenuating circumstances.

SUMMARY OF DISCLOSURE

In a first implementation, a computer-implemented method includes identifying, using one or more computing devices, an appointment scheduled for at least one user, the appointment associated with a calendar of the at least one user. The method may further include determining, using the one or more computing devices, a present location for the at least one user and determining, using the one or more computing devices, a location associated with the appointment. The method may further include generating, using the one or more computing devices, a reminder for the appointment based upon, at least in part, the present location and the location associated with the appointment.

In another implementation a computer-implemented method may include identifying, using one or more computing devices, an appointment scheduled for at least one user. The method may further include determining, using the one or more computing devices, a present location for the at least one user and generating, using the one or more computing devices, a reminder for the appointment based upon, at least in part, the present location.

One or more of the following features may be included. In some embodiments, the appointment may be associated with a calendar associated with the at least one user. In some embodiments, determining may be based upon, at least in part, a user's default location. In some embodiments, determining may be based upon, at least in part, latitude enabled functionality. In some embodiments, determining may be based upon, at least in part, one or more applications configured to transmit a current location at a predetermined interval. Some embodiments may include adjusting a reminder time based upon, at least in part, a traffic condition associated with a route to a location associated with the appointment. Some embodiments may include transmitting one or more directions to the at least one user based upon, at least in part, at least one of the present location and the location associated with the appointment.

In another implementation, a computing system includes a processor and memory configured to perform operations including identifying, using one or more computing devices, an appointment scheduled for at least one user. The method may further include determining, using the one or more computing devices, a present location for the at least one user and generating, using the one or more computing devices, a reminder for the appointment based upon, at least in part, the present location.

One or more of the following features may be included. In some embodiments, the appointment may be associated with a calendar associated with the at least one user. In some embodiments, determining may be based upon, at least in part, a user's default location. In some embodiments, determining may be based upon, at least in part, latitude enabled functionality. In some embodiments, determining may be based upon, at least in part, one or more applications configured to transmit a current location at a predetermined interval. Some embodiments may include adjusting a reminder time based upon, at least in part, a traffic condition associated with a route to a location associated with the appointment. Some embodiments may include transmitting one or more directions to the at least one user based upon, at least in part, at least one of the present location and the location associated with the appointment.

In another implementation a computer program product including a non-transitory computer-readable storage medium having stored thereon instructions, which when executed by a processor result in one or more operations. Operations may include identifying, using one or more computing devices, an appointment scheduled for at least one user. Operations may further include determining, using the one or more computing devices, a present location for the at least one user and generating, using the one or more computing devices, a reminder for the appointment based upon, at least in part, the present location.

One or more of the following features may be included. In some embodiments, the appointment may be associated with a calendar associated with the at least one user. In some embodiments, determining may be based upon, at least in part, a user's default location. In some embodiments, determining may be based upon, at least in part, latitude enabled functionality. In some embodiments, determining may be based upon, at least in part, one or more applications configured to transmit a current location at a predetermined interval. Some embodiments may include adjusting a reminder time based upon, at least in part, a traffic condition associated with a route to a location associated with the appointment. Some embodiments may include transmitting one or more directions to the at least one user based upon, at least in part, at least one of the present location and the location associated with the appointment.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

As discussed above, existing email systems may be configured to generate one or more reminders for upcoming events scheduled in a user's calendar. For example, by default, reminders may be sent some set time (e.g. 10 minutes) before an event. The user may be provided with the option to change the reminder time to a fixed time interval (e.g. 20 or 30 minutes before an event). In each case, these reminders occur at a predefined time regardless of extenuating circumstances.

Embodiments of location-based reminder process 10 described herein may be used to send user's event reminders at smarter, more useful times. For example, a user may live in Mountain View, Calif. and may have RSVP'd to a birthday party in San Francisco, Calif. In this particular example, reminding the user 10 minutes before the party is likely too late. Accordingly, location-based reminder process 10 described herein may be configured to determine that it will take the user approximately 45 minutes to drive to San Francisco, and may then send a smart reminder 55 minutes prior to the event informing the user that they have 10 minutes before he or she needs to depart.

Figure 1:
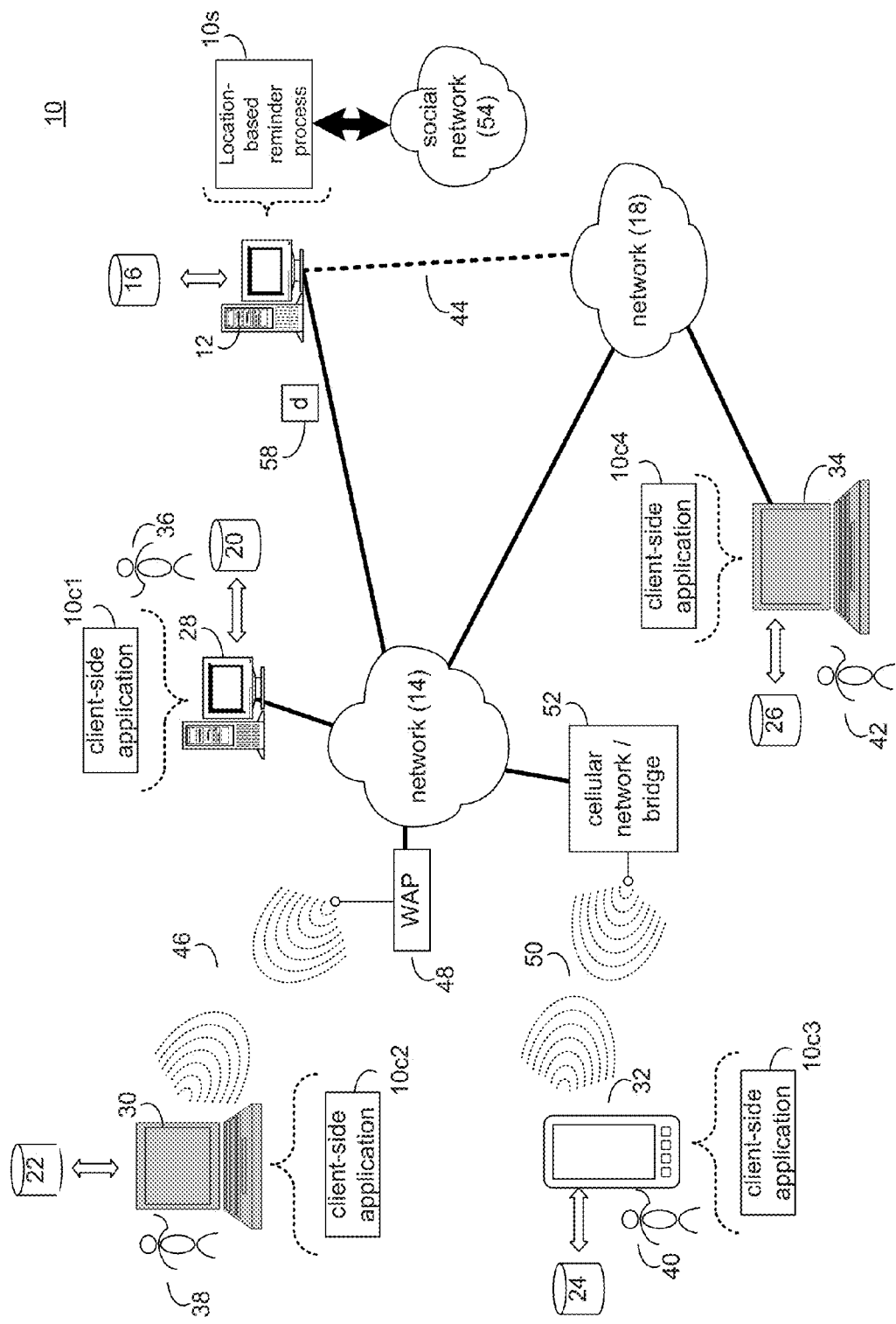
FIG. 1 is a diagrammatic view of a distributed computing network including a computing device that executes a reminder process according to an embodiment of the present disclosure.

Referring to FIG. 1, there is shown reminder process 10. For the following discussion, it is intended to be understood that reminder process 10 may be implemented in a variety of ways. For example, reminder process 10 may be implemented as a server-side process, a client-side process, or a server-side/client-side process.

For example, reminder process 10 may be implemented as a purely server-side process via reminder process 10*s*. Alternatively, reminder process 10 may be implemented as a purely client-side process via one or more of client-side application 10*c*1, client-side application 10*c*2, client-side application 10*c*3, and client-side application 10*c*4. Alternatively still, reminder process 10 may be implemented as a server-side/client-side process via reminder process 10*s* in combination with one or more of client-side application 10*c*1, client-side application 10*c*2, client-side application 10*c*3, and client-side application 10*c*4.

Accordingly, reminder process 10 as used in this disclosure may include any combination of reminder process 10*s*, client-side application 10*c*1, client-side application 10*c*2, client-side application 10*c*3, and client-side application 10*c*4.

Figure 2:
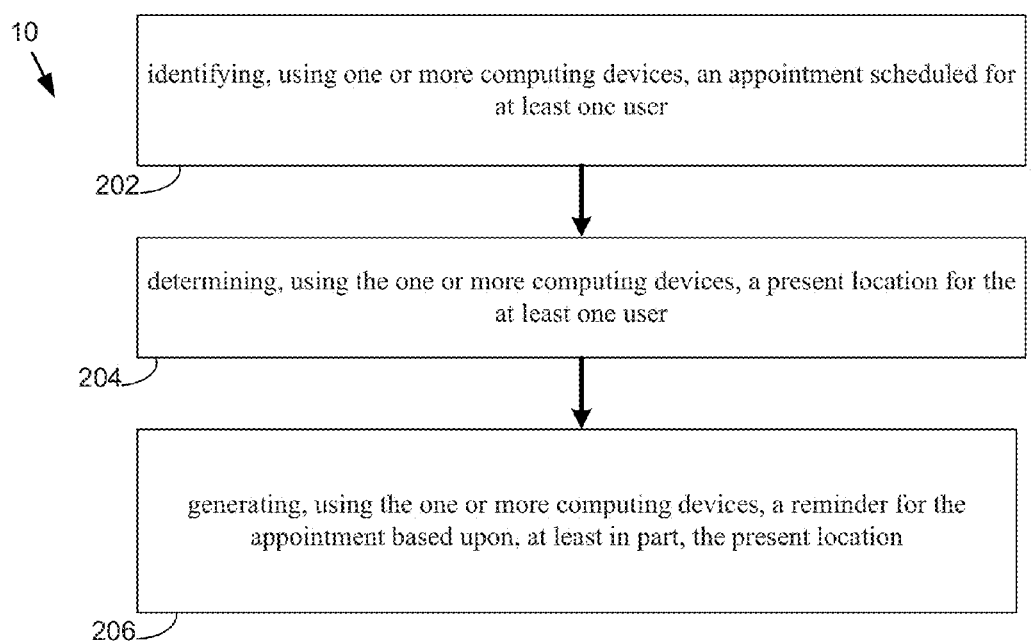
FIG. 2 is a flowchart of operations consistent with an embodiment of the reminder process of the present disclosure.

Referring also to FIG. 2 and as will be discussed below in greater detail, reminder process 10 may include identifying (102), using one or more computing devices, an appointment scheduled for at least one user. Reminder process 10 may further include determining (104), using the one or more computing devices, a present location for the at least one user. Reminder process 10 may also include generating (106), using the one or more computing devices, a reminder for the appointment based upon, at least in part, the present location.

Reminder process 10 may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of reminder process 10, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10*c*1, 10*c*2, 10*c*3, and 10*c*4 may include but are not limited to a web browser, a game console user interface, a television user interface, or a specialized application (e.g., an application running on a mobile platform). The instruction sets and subroutines of client-side applications 10*c*1, 10*c*2, 10*c*3, and 10*c*4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, desktop computer 28, laptop computer 30, data-enabled, cellular telephone 32, notebook computer 34, a server computer (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access reminder process 10 directly through network 14 or through secondary network 18. Further, reminder process 10 may be accessed through secondary network 18 via link line 44.

The various client electronic devices (e.g., client electronic devices 28, 30, 32, 34) may be directly or indirectly coupled to network 14 (or network 18). For example, desktop computer 28 is shown directly coupled to network 14 via a hardwired network connection. Laptop computer 30 is shown wirelessly coupled to network 14 via wireless communication channel 46 established between laptop computer 30 (respectively) and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection.

Reminder process 10 may be configured to interact with social network 54. Accordingly, reminder process 10 may be configured to be a portion of/included within social network 54. Alternatively, reminder process 10 may be configured to be a stand-alone process that interacts with (via e.g., an API) social network 54.

As discussed above and referring also to FIGS. 3-4, reminder process 10, consistent with embodiments of the present disclosure, may configured to generate one or more location-based reminders, which may be associated with a particular appointment scheduled for a user. Accordingly, embodiments of reminder process 10 may be associated with an email application, a user's calendar, to-do list, or any other suitable listing or collection of a user's appointments.

In some embodiments, reminder process 10 may be configured for use with a portable electronic device such as cellphone 40 shown in FIG. 1. In this way, user 40 may access reminder process 10 using cellphone 40, which may be in communication with server computing device 12. Accordingly, reminder process 10 may include identifying (102), using one or more computing devices (e.g. server computing device 12, cellphone 40, etc.), an appointment scheduled for at least one user. As discussed herein, the appointment may be associated with any suitable application and may be associated with any of the user's devices. For example, in some embodiments, the appointment may be stored in a calendar, which may be associated with one or more of server computing device 12 and/or associated with an email application (e.g. client-side application 10c3) operating on cellphone 40.

Figure 3:
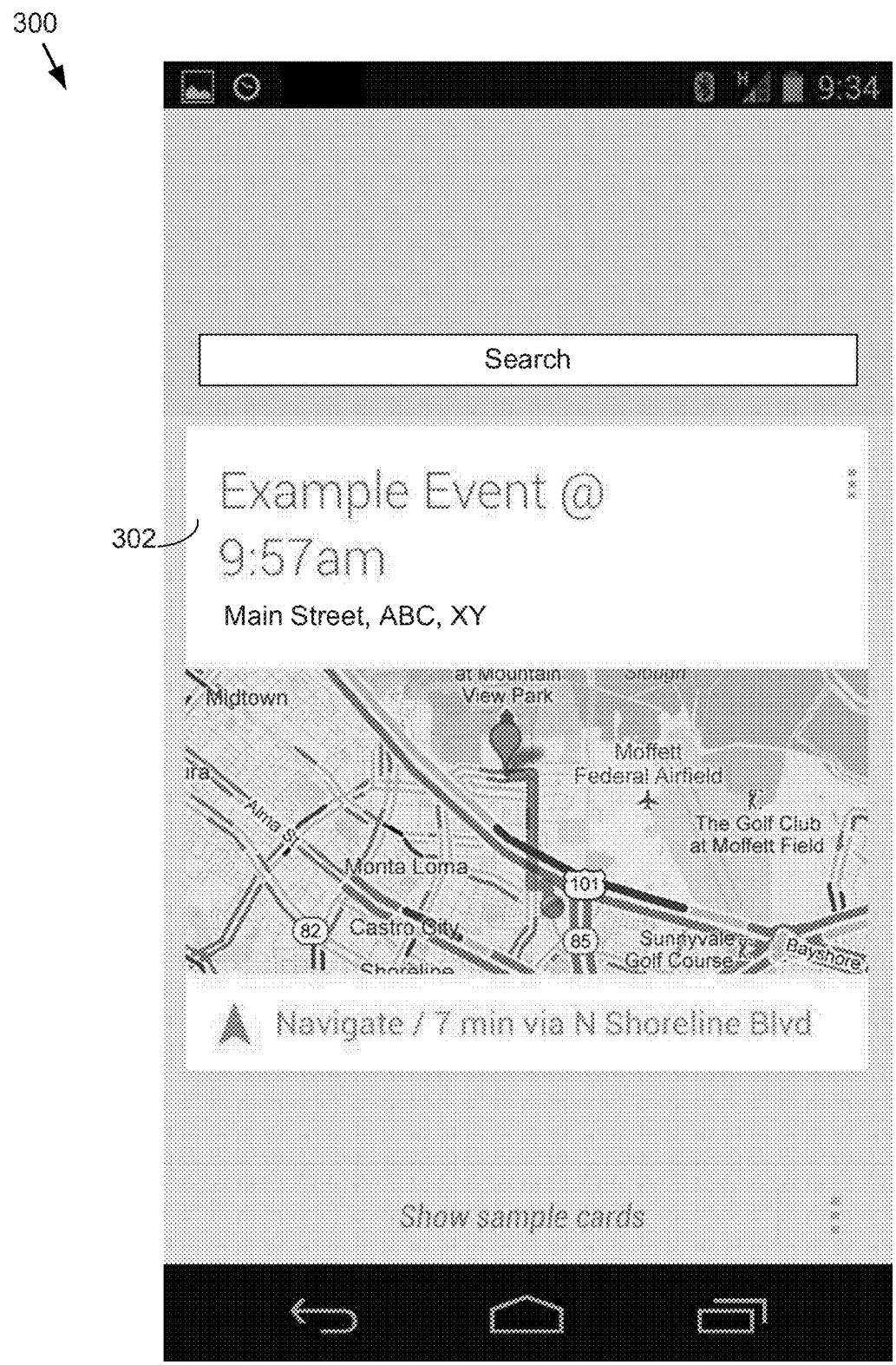
FIG. 3 is a diagrammatic view of an interface consistent with an embodiment of the reminder process of FIG. 1.

In the particular example depicted in FIG. 3, an embodiment of a user interface 300 associated with reminder process 10 is shown. In this particular example, the user (e.g. user 40) may have an appointment 302 scheduled for that day at a particular time and place (e.g. Example Event at 9:57 am on Main Street, ABC city, XY state). As shown in FIG. 3, reminder process 10 may include navigation functionality and/or may be configured to operate in conjunction with one or more navigation and/or map applications. In this way, user 40 may be provided with map directions and with the estimated travel time that is required in order to get the event location.

In this way, reminder process 10 may be configured to determine (104), using the one or more computing devices (e.g. server computing device 12, cellphone 40, etc.), a present location for the user (e.g. user 40). In some embodiments, the user's present location may be determined using any location suitable functionality, e.g. Global Positioning (GPS), and/or any other approach. In some instances, the user may be provided with the option of enabling one or more features associated with reminder process 10 (e.g. enabling location-based services, enabling reminder process 10, etc.).

In some embodiments, determining the user's location may be performed using any suitable approach. Some of these may include, but are not limited to, utilizing a "default location" associated with a map application, utilizing latitude enabled functionality, in order to identify exactly where the user is located, which may be based upon the user's exact location. Additionally and/or alternatively, reminder process 10 may be used in conjunction with one or more applications configured to "check in" at predetermined intervals around the event time so the system can get the user's current location without using latitude. In some embodiments, determining may be based upon, at least in part, one or more applications configured to transmit a current location at a predetermined interval.

Additionally and/or alternatively, the location-based reminder process may be configured to adjust a reminder time based upon, at least in part, a traffic condition associated with a route to a location associated with the appointment. The location-based reminder process may also be configured to transmit one or more directions to the user based upon the present location and the location associated with the appointment (e.g. transmit a link to directions, or a link that can launch the navigation software on the user's phone).

Figure 4:
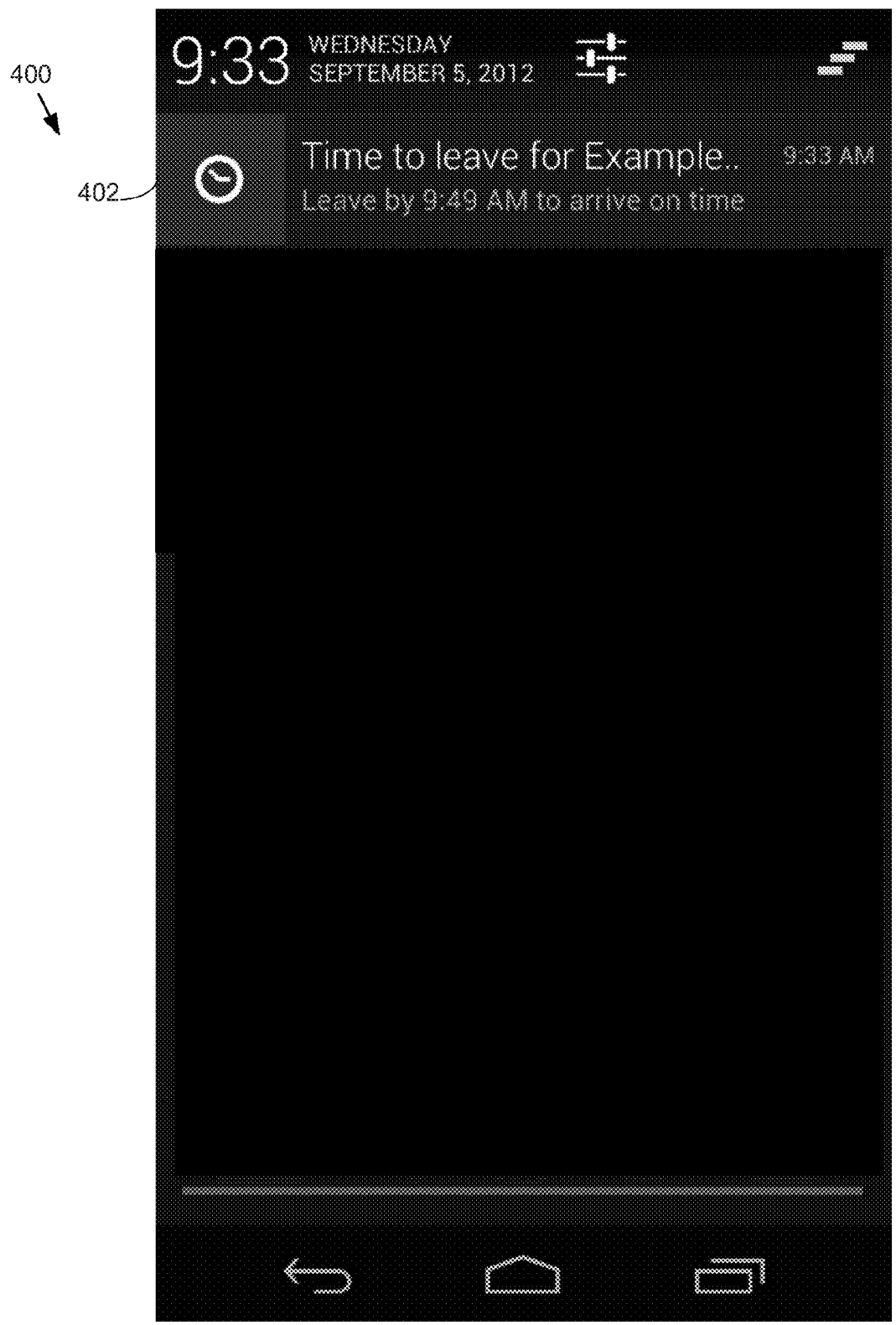
FIG. 4 is a diagrammatic view of an interface consistent with an embodiment of the reminder process of FIG. 1.

As shown in FIG. 4, once reminder process 10 has determined the user's present location, reminder process 10 may include generating, using the one or more computing devices (e.g. server computing device 12, cellphone 40, etc.), a reminder 402 for the appointment, which may take into account the user's present location. In the example shown in FIGS. 3-4, user 40 may have an appointment scheduled for 9:57 am at a different geographic location from the user's present location. Reminder process 10 may then generate reminder 402 at 9:33 am, which may indicate to the user that he/she needs to leave by 9:49 am in order to arrive at the appointment on time, i.e. by 9:57 am. As shown in FIG. 3, reminder process 10 may be configured to determine the travel time from the user's present location to the location of the appointment. It should be noted that various settings associated with reminder process 10 may be configured according to the preferences of the user. For example, and as shown in FIG. 4, the user may request a reminder some number of minutes prior to the recommended departure time associated with reminder 402, in this particular example 9:33 am. Additionally and/or alternatively, reminder process 10 may be configured to generate reminder 402 at the recommended departure time, in this particular example 9:49 am.

Embodiments of reminder process 10 disclosed herein may be configured for use with non-mobile devices such as those shown above with reference to FIG. 1. Accordingly, reminder process 10 may operate in a similar manner as discussed above.

Figure 5:
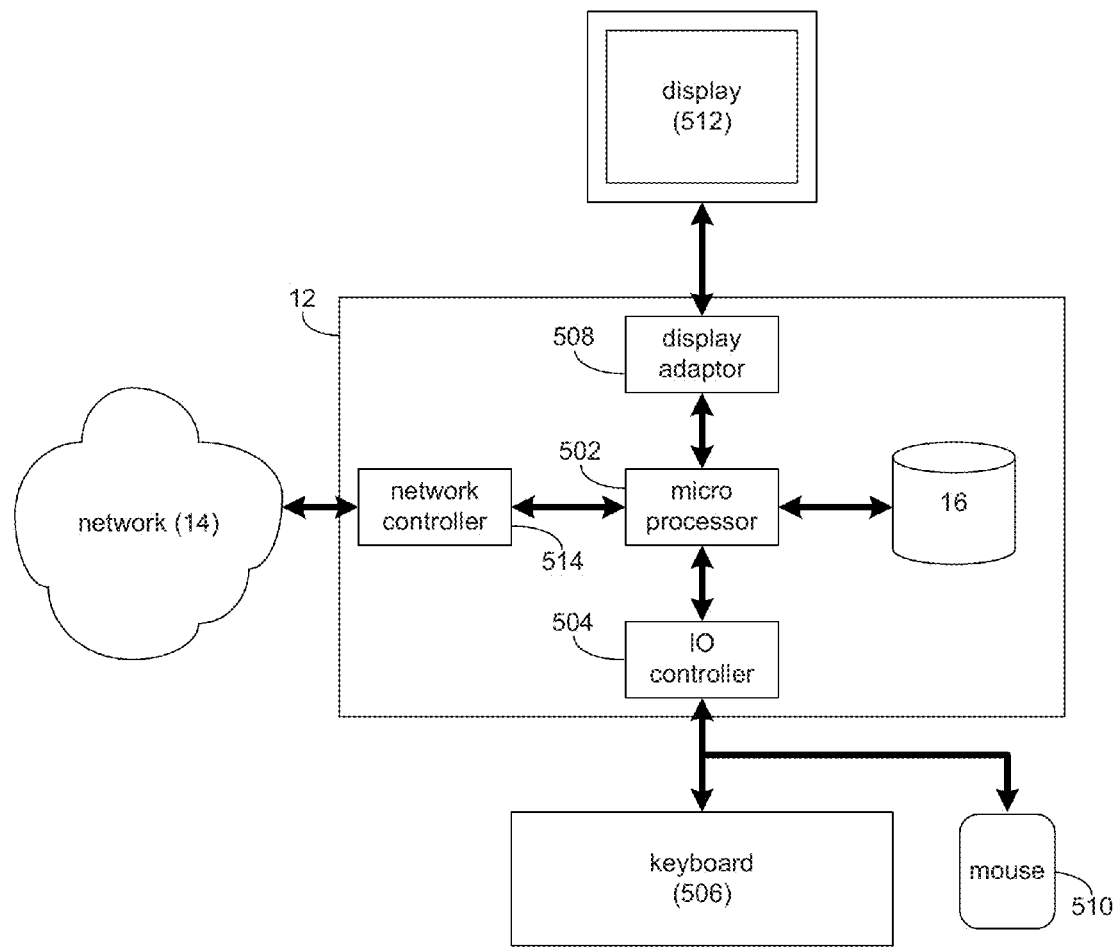
FIG. 5 is a diagrammatic view of a client electronic device consistent with an embodiment of the reminder process of FIG. 1.

Referring also to FIG. 5, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, reminder process 10 may be substituted for computing device 12 within FIG. 5, examples of which may include but are not limited to client electronic devices 28, 30, 32, 34.

Computing system 12 may include microprocessor 502 configured to e.g., process data and execute instructions/code for image comparison process 10. Microprocessor 502 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 504 may be configured to couple microprocessor 502 with various devices, such as keyboard 506, mouse 510, USB ports (not shown), and printer ports (not shown). Display adaptor 508 may be configured to couple display 512 (e.g., a CRT or LCD monitor) with microprocessor 502, while network adapter 514 (e.g., an Ethernet adapter) may be configured to couple microprocessor 502 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   identifying, using one or more computing devices, an appointment scheduled for at least one user, the scheduled appointment associated with a calendar of the at least one user;
   receiving at a predetermined interval of the one or more computing device, check in information of a present location for the at least one user from an application executing on a computing device of the at least one user, wherein the check in information is received without the use of a latitude;
   determining, using the one or more computing devices, a location associated with the scheduled appointment;
   determining a reminder time based upon, at least in part, an estimated travel time for a route from the present location to the location associated with the scheduled appointment; and
   generating, using the one or more computing devices, a location-based reminder for the scheduled appointment at the reminder time, wherein the reminder time is adjustable.

2. The method of claim 1, wherein the location-based reminder includes a departure time is based, at least in part, on the estimated travel time and the at least one condition associated with the route.

3. The method of claim 2, wherein the location-based reminder further includes an indication of an amount of time prior to a departure time.

4. A computer-implemented method comprising:
   identifying, using one or more computing devices, an appointment scheduled for at least one user;
   receiving at a predetermined interval at the one or more computing device, check in information from an application executing on a least one user computing device wherein the check in information includes a present location for the least one user;
   determining, using the one or more computing devices, a location associated with the scheduled appointment; and
   generating, using the one or more computing devices, a location-based reminder for the scheduled appointment at a reminder time based upon, at least in part, an estimated travel time from the present location to the location associated with the scheduled appointment, wherein the reminder time is adjustable based upon, at least in part, at least one condition associated with a route from the present location to the location associated with the scheduled appointment.

5. The computer-implemented method of claim 4, wherein the at least one condition includes a traffic condition associated with the route and the computer-implemented method further comprising adjusting the reminder time based upon, at least in part, the traffic condition.

6. The computer-implemented method of claim 4, wherein determining of the present location for the at least one user is based upon, at least in part, location-based services associated with the at least one user's present location.

7. The computer-implemented method of claim 4, wherein the scheduled appointment is associated with a collection of appointments associated with the at least one user.

8. The computer-implemented method of claim 4, further comprising:
   transmitting one or more directions to the at least one user based upon, at least in part, the present location of the user.

9. The computer-implemented method of claim 4, further comprising:
   transmitting one or more directions to the at least one user based upon, at least in part, the location associated with the scheduled appointment.

10. The method of claim 4, wherein the location-based reminder includes a departure time based, at least in part, on the estimated travel time and the at least one condition associated with the route.

11. The method of claim 10, wherein the location-based reminder further includes an indication of an amount of time prior to a departure time.

12. A computing system including a processor and memory configured to perform operations comprising:
    identifying, using one or more computing devices, an appointment scheduled for at least one user;
    receiving, at a predetermined interval at the one or more computing device, check in information from an application executing on at least one user computing device wherein the check in information includes a present location for the at least one user;
    determining, using the one or more computing devices, a location associated with the scheduled appointment; and
    generating, using the one or more computing devices, a location-based reminder for the scheduled appointment at a reminder time based upon, at least in part, the present location an estimated travel time from the present location to the location associated with the scheduled appointment, wherein the reminder time is adjustable based upon, at least in part, at least one condition associated with a route from the present location to the location associated with the scheduled appointment.

13. The computing system of claim 12, wherein the scheduled appointment is associated with a calendar associated with the at least one user.

14. The computing system of claim 12, wherein the at least one condition includes a traffic condition associated with the route and the computer system is further configured to perform adjusting the reminder time based upon, at least in part, the traffic condition.

15. The computing system of claim 12, further comprising:
    transmitting one or more directions to the at least one user based upon, at least in part, at least one of the present location and the location associated with the appointment.

16. The computing system of claim 12, wherein the location-based reminder includes a departure time based, at least in part, on the estimated travel time and the at least one condition associated with the route.

17. The computing system of claim 16, wherein the location-based reminder further includes an indication of an amount of time prior to a departure time.

* * * * *